(12) United States Patent
Ozturk et al.

(10) Patent No.: US 12,309,741 B2
(45) Date of Patent: May 20, 2025

(54) RESPONDING TO PAGING BY MULTIPLE-UNIVERSAL SUBSCRIPTION IDENTITY MODULE DEVICES

(71) Applicant: QUALCOMM Incorporated, San Diego, CA (US)

(72) Inventors: Ozcan Ozturk, San Diego, CA (US); Juan Zhang, Beijing (CN); Gavin Bernard Horn, La Jolla, CA (US); John Wallace Nasielski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 17/756,293

(22) PCT Filed: Dec. 20, 2019

(86) PCT No.: PCT/CN2019/126871
§ 371 (c)(1),
(2) Date: May 20, 2022

(87) PCT Pub. No.: WO2021/120147
PCT Pub. Date: Jun. 24, 2021

(65) Prior Publication Data
US 2023/0008709 A1  Jan. 12, 2023

(51) Int. Cl.
*H04W 68/00* (2009.01)
*H04W 8/18* (2009.01)
(Continued)

(52) U.S. Cl.
CPC ........... *H04W 68/00* (2013.01); *H04W 8/183* (2013.01); *H04W 76/15* (2018.02); *H04W 76/27* (2018.02);
(Continued)

(58) Field of Classification Search
CPC ..... H04W 68/00; H04W 8/183; H04W 76/15; H04W 76/27; H04W 74/0833; H04W 88/06
(Continued)

(56) References Cited

U.S. PATENT DOCUMENTS

| 2009/0149162 A1* | 6/2009 | Tenny | H04W 76/20 455/414.1 |
| 2009/0239584 A1* | 9/2009 | Jheng | H04W 12/06 455/558 |

(Continued)

FOREIGN PATENT DOCUMENTS

| CN | 101800963 A | * | 8/2010 | |
| CN | 103262625 A | * | 8/2013 | ............ H04W 68/00 |

(Continued)

OTHER PUBLICATIONS

Supplementary European Search Report—EP19956586—Search Authority—Berlin—Jul. 13, 2023.
(Continued)

*Primary Examiner* — Mahendra R Patel
(74) *Attorney, Agent, or Firm* — Patterson & Sheridan, LLP

(57) ABSTRACT

Certain aspects of the present disclosure provide techniques for responding to paging by multiple-universal subscription identity module (multi-USIM) devices. A method that may be performed by a user equipment (UE) includes camping on a first cell associated with a first universal subscriber identity module (USIM), wherein the UE has a first USIM and a second USIM; receiving a paging message from the first cell; and transmitting, in response to the paging message, a first response message indicating that the UE requests to enter an idle or inactive mode on the first cell.

29 Claims, 7 Drawing Sheets

(51) Int. Cl.
*H04W 74/0833* (2024.01)
*H04W 76/15* (2018.01)
*H04W 76/27* (2018.01)
*H04W 88/06* (2009.01)

(52) U.S. Cl.
CPC ........ *H04W 74/0833* (2013.01); *H04W 88/06* (2013.01)

(58) Field of Classification Search
USPC ......................................................... 455/458
See application file for complete search history.

(56) References Cited

U.S. PATENT DOCUMENTS

| | | | | |
|---|---|---|---|---|
| 2010/0075716 | A1* | 3/2010 | Chang | H04M 1/724 455/558 |
| 2013/0064176 | A1* | 3/2013 | Hsu | H04W 4/02 370/328 |
| 2014/0228070 | A1* | 8/2014 | Josso | H04W 88/18 455/552.1 |
| 2016/0353516 | A1* | 12/2016 | Rajurkar | H04W 8/183 |
| 2017/0070877 | A1* | 3/2017 | Shi | H04W 8/183 |
| 2017/0150545 | A1 | 5/2017 | Ramkumar et al. | |
| 2017/0325278 | A1* | 11/2017 | Ramkumar | H04W 8/082 |
| 2018/0077728 | A1* | 3/2018 | Shi | H04W 76/10 |
| 2023/0093965 | A1* | 3/2023 | Velev | H04W 68/12 455/458 |

FOREIGN PATENT DOCUMENTS

| | | | |
|---|---|---|---|
| CN | 103404203 A | 11/2013 | |
| CN | 106464611 A | 2/2017 | |
| WO | WO-2015180134 A1 * | 12/2015 | ........... H04B 1/3816 |
| WO | WO-2016003562 A1 * | 1/2016 | ............. H04W 4/22 |
| WO | WO-2016177158 A1 * | 11/2016 | |
| WO | WO-2020137238 A1 * | 7/2020 | .......... H04W 60/005 |

OTHER PUBLICATIONS

International Search Report and Written Opinion—PCT/CN2019/126871—ISA/EPO—Sep. 24, 2020.

* cited by examiner

RESPONDING TO PAGING BY MULTIPLE-UNIVERSAL SUBSCRIPTION IDENTITY MODULE DEVICES

CROSS-REFERENCE TO RELATED APPLICATIONS

This application is a national stage application under 35 U.S.C. 371 of PCT/CN2019/126871, filed Dec. 20, 2019, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for responding to paging by multiple universal subscription identity module (multi-USIM) devices.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved transmission resource utilization.

Certain aspects provide a method for wireless communication by a user equipment (UE). The method generally includes camping on a first cell associated with a first universal subscriber identity module (USIM), wherein the UE has a first USIM and a second USIM; receiving a paging message from the first cell; and transmitting, in response to the paging message, a first response message indicating that the UE requests to enter an idle or inactive mode on the first cell.

Certain aspects provide a method for wireless communication by a base station (BS). The method generally includes transmitting a paging message requesting that a user equipment (UE) enter a connected mode on a first cell; receiving, in response to the paging message, a first response message indicating that the UE requests to enter an idle or inactive mode on the first cell; and transmitting a reply to the first response message.

Certain aspects provide an apparatus for wireless communication. The apparatus generally includes a processor configured to camp on a first cell associated with a first universal subscriber identity module (USIM), wherein the apparatus has a first USIM and a second USIM; to receive a paging message from the first cell; and to transmit, in response to the paging message, a first response message indicating that the apparatus requests to enter an idle or inactive mode on the first cell; and a memory coupled with the processor.

Certain aspects provide an apparatus for wireless communication. The apparatus generally includes a processor configured to transmit a paging message requesting that a user equipment (UE) enter a connected mode on a first cell; to receive, in response to the paging message, a first response message indicating that the UE requests to enter an idle or inactive mode on the first cell; and to transmit a reply to the first response message; and a memory coupled with the processor.

Certain aspects provide an apparatus for wireless communication. The apparatus generally includes means for camping on a first cell associated with a first universal subscriber identity module (USIM), wherein the apparatus has a first USIM and a second USIM; means for receiving a paging message from the first cell; and means for transmitting, in response to the paging message, a first response message indicating that the apparatus requests to enter an idle or inactive mode on the first cell.

Certain aspects provide an apparatus for wireless communication. The apparatus generally includes means for transmitting a paging message requesting that a user equipment (UE) enter a connected mode on a first cell; means for receiving, in response to the paging message, a first response message indicating that the UE requests to enter an idle or inactive mode on the first cell; and means for transmitting a reply to the first response message.

Certain aspects provide a computer-readable medium for wireless communication by a user equipment (UE). The computer-readable medium includes instructions that, when executed by a processing system of the UE, cause the processing system to perform operations generally including camping on a first cell associated with a first universal subscriber identity module (USIM), wherein the UE has a first USIM and a second USIM; receiving a paging message from the first cell; and transmitting, in response to the paging message, a first response message indicating that the UE requests to enter an idle or inactive mode on the first cell.

Certain aspects provide a computer-readable medium for wireless communication by a base station (BS). The computer-readable medium includes instructions that, when executed by a processing system of the UE, cause the processing system to perform operations generally including transmitting a paging message requesting that a user equipment (UE) enter a connected mode on a first cell; receiving, in response to the paging message, a first response message indicating that the UE requests to enter an idle or inactive mode on the first cell; and transmitting a reply to the first response message.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
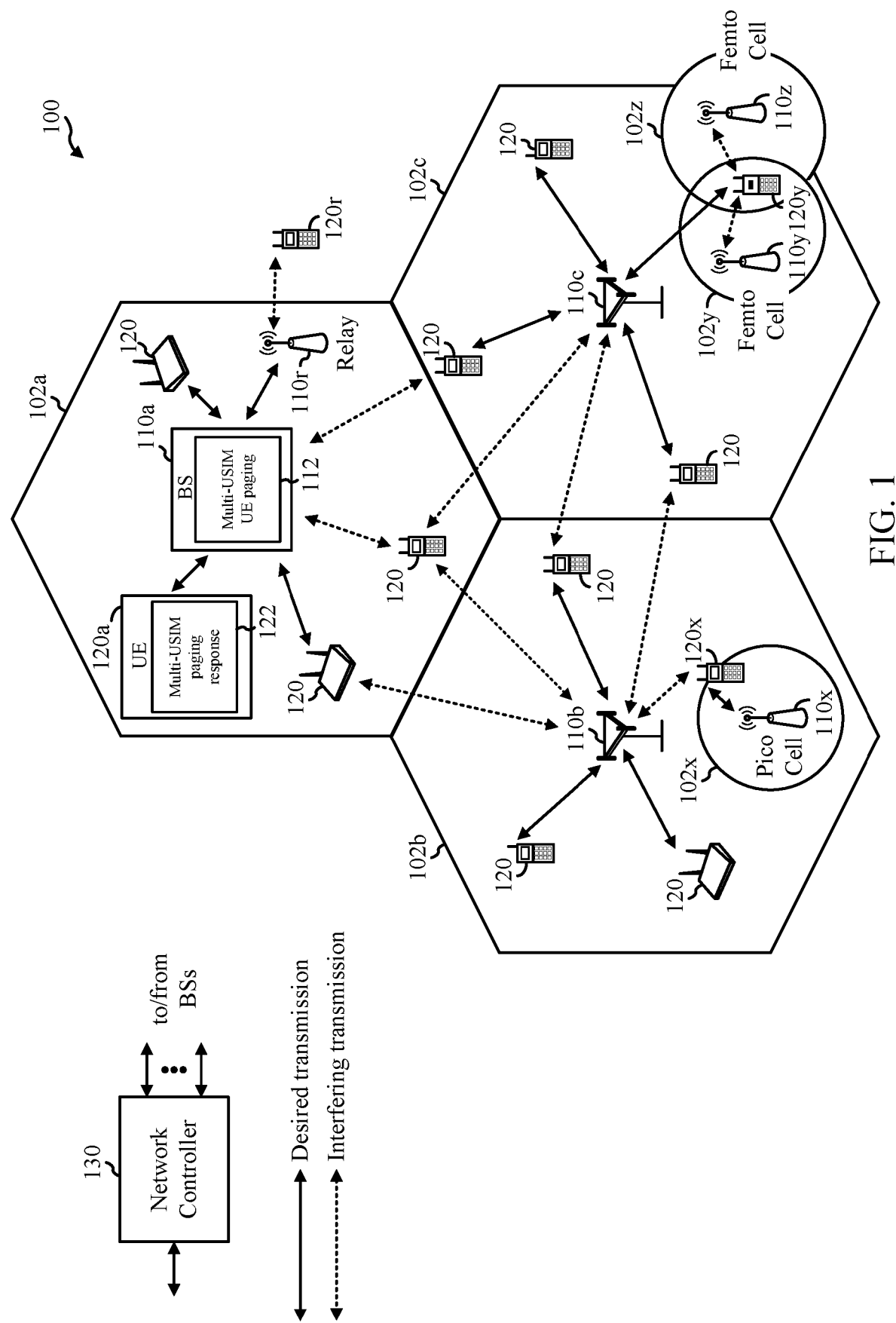
FIG. 1 is a block diagram conceptually illustrating an example telecommunications system, in accordance with certain aspects of the present disclosure.

Aspects of the present disclosure provide apparatus, methods, processing systems, and computer readable mediums for a UE with multiple universal subscription identity modules (i.e., a multi-USIM device) or concurrent radio access technology (C-RAT) capabilities to respond to a page from a cell by informing the network that the UE has received the page but requests to go back to an idle or inactive mode on the cell. C-RAT-capable UEs and multi-USIM UEs may not have the capability to receive data or signaling simultaneously on both access links. One important scenario is when the UE is in connected mode on a first cell associated with a first USIM while the UE is only monitoring paging on a second cell associated with a second USIM. If the UE is paged on the second cell but has important communication happening on the first cell, the UE may decide to "ignore" the page and stay connected on the first cell. In the described scenario, the UE cannot or does not prefer to be connected in both of the cells; this could be, for example, due to resource and/or capability restrictions of the UE. A simple technique for the UE to ignore the page is for the UE to just not respond to the page. However, this can cause the network (NW) to continue paging and transmit paging in more cells, since the NW is not aware of the UE preference and thus will assume that the UE just did not receive the page. According to aspects of the present disclosure, a UE may avoid the described problem by quickly responding to the page by informing the NW that the UE has received the page but requests to go back to an idle or inactive mode on the cell.

The following description provides examples of techniques for multi-USIM devices to respond to paging with a request to enter an idle or inactive mode on the cell sending the paging in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured to enable multi-USIM UEs to respond to paging by requesting to enter an idle or inactive mode on a paging cell. As shown in FIG. 1, the BS 110a includes a multi-USIM UE paging manager 112. The multi-USIM UE paging manager 112 may be configured to transmit a paging message requesting that a user equipment (UE) enter a connected mode on a first cell; to receive, in response to the paging message, a first response message indicating that the UE requests to enter an idle or inactive mode on the first cell; and to transmit a reply to the first response message, in accordance with aspects of the present disclosure. In some examples, the multi-USIM UE paging manager 112 may transmit an indication of a preamble and transmission resources for the first message of a random access channel (RACH) procedure in the paging message. As shown in FIG. 1, the UE 120a includes a multi-USIM paging response manager 122. The multi-USIM paging response manager 122 may be configured to camp on a first cell associated with a first universal subscriber identity module (USIM), wherein the UE has a first USIM and a second USIM; to receive a paging message from the first cell; and to transmit, in response to the paging message, a first response message indicating that the UE requests to enter an idle or inactive mode on the first cell, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
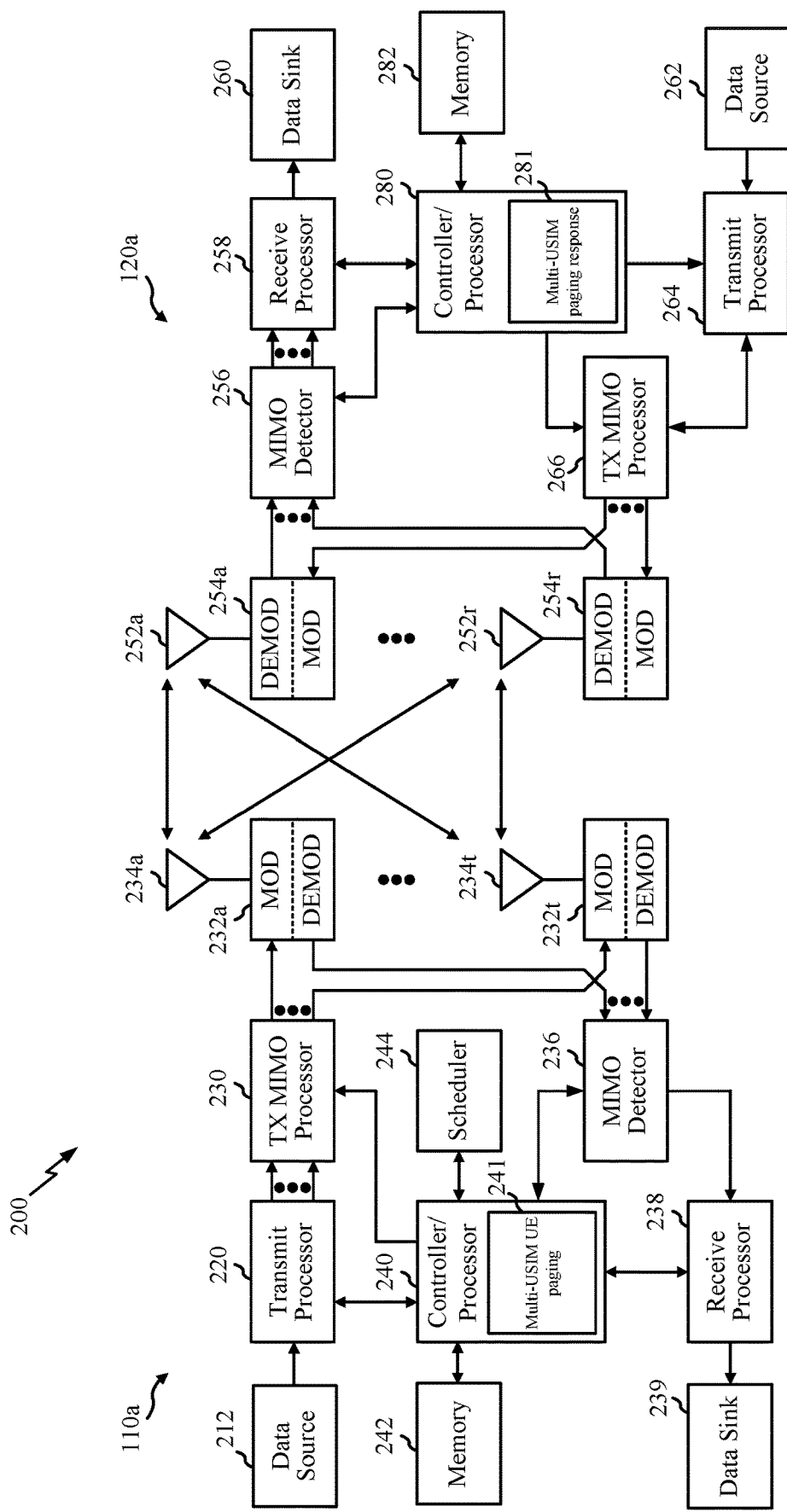
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. For example, as shown in FIG. 2, the controller/processor 240 of the BS 110a has a multi-USIM UE paging manager 241 that may be configured for transmitting a paging message requesting that a user equipment (UE) enter a connected mode on a first cell; for receiving, in response to the paging message, a first response message indicating that the UE requests to enter an idle or inactive mode on the first cell; and for transmitting a reply to the first response message, according to aspects described herein. As shown in FIG. 2, the controller/processor 280 of the UE 120a has a multi-USIM paging response manager 241 that may be configured for camping on a first cell associated with a first universal subscriber identity module (USIM), wherein the UE has a first USIM and a second USIM; for receiving a paging message from the first cell; and for transmitting, in response to the paging message, a first response message indicating that the UE requests to enter an idle or inactive mode on the first cell, according to aspects described herein. Although shown at the Controller/Processor, other components of the UE 120a and BS 110a may be used performing the operations described herein.

C-RAT-capable UEs and multi-USIM UEs may not have the capability to receive data or signaling simultaneously on both access links. One important scenario is when the UE is in connected mode on a first cell associated with a first USIM while the UE is only monitoring paging on a second cell associated with a second USIM. If the UE is paged on the second cell but has important communication happening on the first cell, the UE may decide to "ignore" the page and stay connected on the first cell. In the described scenario, the UE cannot or does not prefer to be connected in both of the cells; this could be, for example, due to resource and/or capability restrictions of the UE. A simple technique for the UE to ignore the page is for the UE to just not respond to the page. However, this can cause the network (NW) to continue paging and transmit paging in more cells, since the NW is not aware of the UE preference and thus will assume that the UE just did not receive the page. According to aspects of the present disclosure, a UE may avoid the described problem by quickly responding to the page by informing the NW that the UE has received the page but requests to go back to an idle or inactive mode on the cell.

Accordingly, what is needed are techniques and apparatus for a UE with multiple universal subscription identity modules (i.e., a multi-USIM device) or concurrent radio access technology (C-RAT) capabilities to respond to a page from a cell by informing the network that the UE has received the page but requests to go back to an idle or inactive mode on the cell.

Example Responding to Paging by Multiple-Universal Subscription Identity Module Devices Aspects of the present disclosure provide apparatus, methods, processing systems, and computer readable mediums for a UE with multiple universal subscription identity modules (i.e., a multi-USIM device) or concurrent radio access technology (C-RAT) capabilities to respond to a page from a cell by informing the network that the UE has received the page but requests to go back to an idle or inactive mode on the cell.

Figure 3:
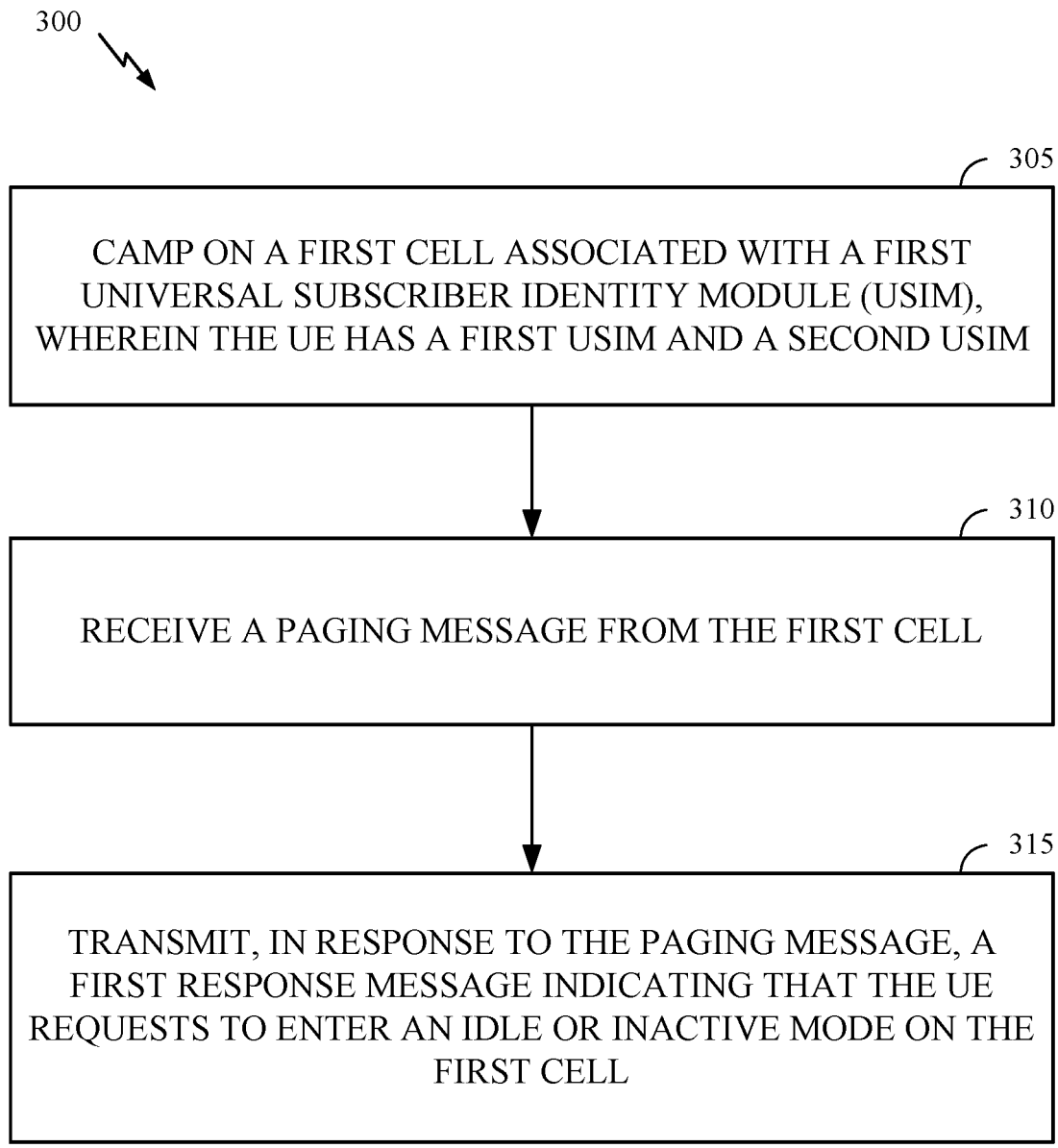
FIG. 3 is a flow diagram illustrating example operations for wireless communication by a UE, in accordance with certain aspects of the present disclosure.

FIG. 3 is a flow diagram illustrating example operations 300 for wireless communication, in accordance with certain aspects of the present disclosure. The operations 300 may be performed, for example, by UE (e.g., such as a UE 120a in the wireless communication network 100). Operations 300 may be implemented as software components that are executed and run on one or more processors (e.g., controller/processor 280 of FIG. 2). Further, the transmission and reception of signals by the UE in operations 300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 300 may begin, at block 305, by camping on a first cell associated with a first universal subscriber identity module (USIM), wherein the UE has a first USIM and a second USIM.

At block 310, operations 300 continue with receiving a paging message from the first cell.

Operations 300 continue at block 315 with transmitting, in response to the paging message, a first response message indicating that the UE requests to enter an idle or inactive mode on the first cell.

According to aspects of the present disclosure, a UE performing operations 300 may be in an idle or connected mode on a second cell associated with the second USIM.

In aspects of the present disclosure, the first response message of block 315 may be a radio resource control (RRC) message.

According to aspects of the present disclosure, the first response message of block 315 may include at least one of a radio resource control (RRC) Setup Request message or an RRC Resume Request message; and the first response message (i.e., the RRC Setup Request message or the RRC Resume Request message) may also include a cause value indicating that the UE requests to enter the idle or the inactive mode on the first cell.

In aspects of the present disclosure, the first response message of block 315 may indicate a period (e.g., a length of a delay or a value to set a timer) after which the UE will request to move to a connected mode on the first cell in response to the paging message.

According to aspects of the present disclosure, a UE performing operations 300 may be in an inactive mode on the first cell prior to receiving the paging message; and the first response message of block 315 may indicate that the UE requests to enter the idle mode on the first cell.

In aspects of the present disclosure, the first response message of block 315 may include a medium access control (MAC) control element (CE).

According to aspects of the present disclosure, a UE performing operations 300 may transmit one or more second response messages indicating that the UE requests to enter the idle mode or the inactive mode on the first cell. In some aspects of the present disclosure, the UE may receive a reply from the first cell and cease transmitting the second response messages, based on the reply. In some aspects, the UE may request, from a second cell associated with the second USIM, additional time to receive a reply from the first cell before resuming communications via the second cell, prior to receiving the reply from the first cell.

In aspects of the present disclosure, the first response message of block 315 may be a first message of a random access channel (RACH) procedure. That is, the UE performing operations 300 may request (in response to receiving a paging message as in block 310) to enter an idle or inactive mode by transmitting a first message of a RACH procedure (e.g., using resources set aside by a cell for this purpose, or including a flag in the first message of the RACH procedure). In some aspects, the RACH procedure may be a four-step RACH procedure, and the UE may obtain a preamble and transmission resources for the first message of the four-step RACH procedure from the paging message of block 310. In some aspects, the RACH procedure may be a two-step RACH procedure, and the UE may obtain preamble resources and payload resource for the first message of the two-step RACH procedure from the paging message of block 310.

According to aspects of the present disclosure, a UE performing operations 300 may refrain from entering a connected mode on the first cell in response to receiving the paging message of block 310.

Figure 4:
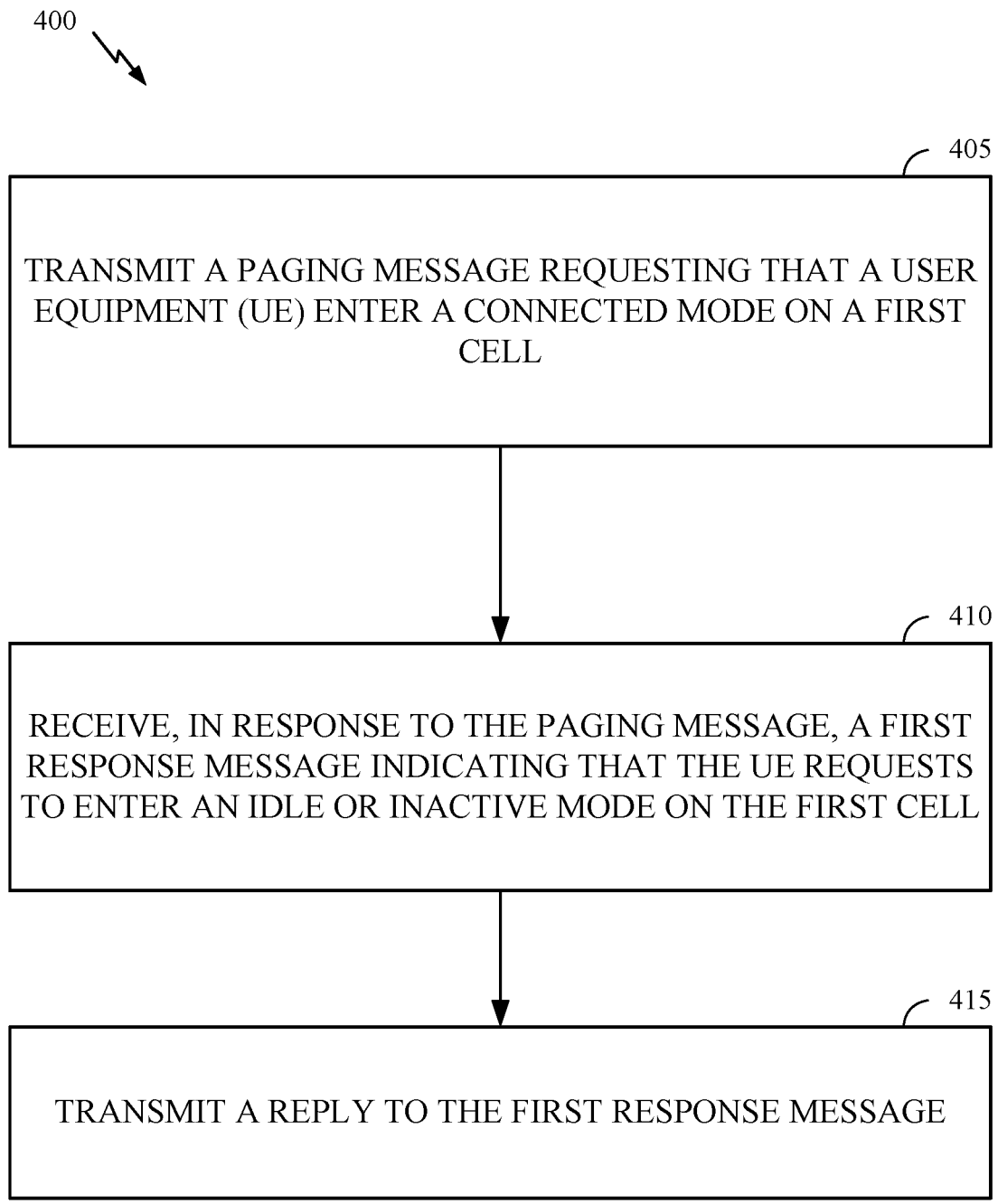
FIG. 4 is a flow diagram illustrating example operations for wireless communication by a BS, in accordance with certain aspects of the present disclosure.

FIG. 4 is a flow diagram illustrating example operations 400 for wireless communication, in accordance with certain aspects of the present disclosure. The operations 400 may be performed, for example, by a BS (e.g., such as the BS 110a in the wireless communication network 100). The operations 400 may be complimentary operations by the BS to the operations 300 performed by the UE. Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 may begin, at block 405, by transmitting a paging message requesting that a user equipment (UE) enter a connected mode on a first cell.

At block 410, operations 400 continue with receiving, in response to the paging message, a first response message indicating that the UE requests to enter an idle or inactive mode on the first cell.

Operations 400 continue at block 415 with transmitting a reply to the first response message.

According to aspects of the present disclosure, the first response message of block 410 may be a first message of a random access channel (RACH) procedure and a BS performing operations 400 may transmitting an indication of a preamble and transmission resources for the first message of the random access channel (RACH) procedure in the paging message of block 405. In some aspects, the RACH procedure may be a four-step RACH procedure. In some aspects, the RACH procedure may be a two-step RACH procedure. In some aspects, the BS may determine to transmit the indication of the preamble and the transmission resources based on the UE having multiple universal subscriber identity modules (USIMs) or the UE supporting paging differentiation.

In aspects of the present disclosure, the first response message of block 410 may be a first message of a random access channel (RACH) procedure; and the reply of block 415 may be a random access response (RAR) message:

According to aspects of the present disclosure, the first response message of block 410 may be a first radio resource control (RRC) message, and the BS may send a second RRC message to the UE replying to the first response message. In some aspects, the second RRC message may be an RRC Release message or an RRC Reject message.

In aspects of the present disclosure, the first response message of block 410 may be a first medium access control (MAC) control element (CE), and the BS may send a second MAC CE to the UE replying to the first response message.

According to aspects of the present disclosure, the first response message of block 410 may include a request from the UE to move to the idle mode on the first cell, and the BS may release an inactive mode connection to the UE and move the UE to the idle mode on the first cell.

In aspects of the present disclosure, a BS performing operations 400 may inform an access management function (AMF) that the UE has responded to the paging message.

According to aspects of the present disclosure, a BS performing operations 400 may inform a mobility management entity (MME) that the UE has responded to the paging message.

In aspects of the present disclosure, a BS performing operations 400 may inform an anchor next generation NodeB (gNB) that the UE has responded to the paging message.

According to aspects of the present disclosure, the first response message of block 410 may indicate a period after which the UE will request to enter the connected mode on the first cell in response to the paging message, and the BS may inform an access management function (AMF) or an anchor next generation NodeB (gNB) of the period.

In aspects of the present disclosure, the first response message of block 410 may indicate a period after which the UE will request to enter the connected mode on the first cell in response to the paging message, and the BS may inform a mobility management entity (MME) of the period.

Figure 5:
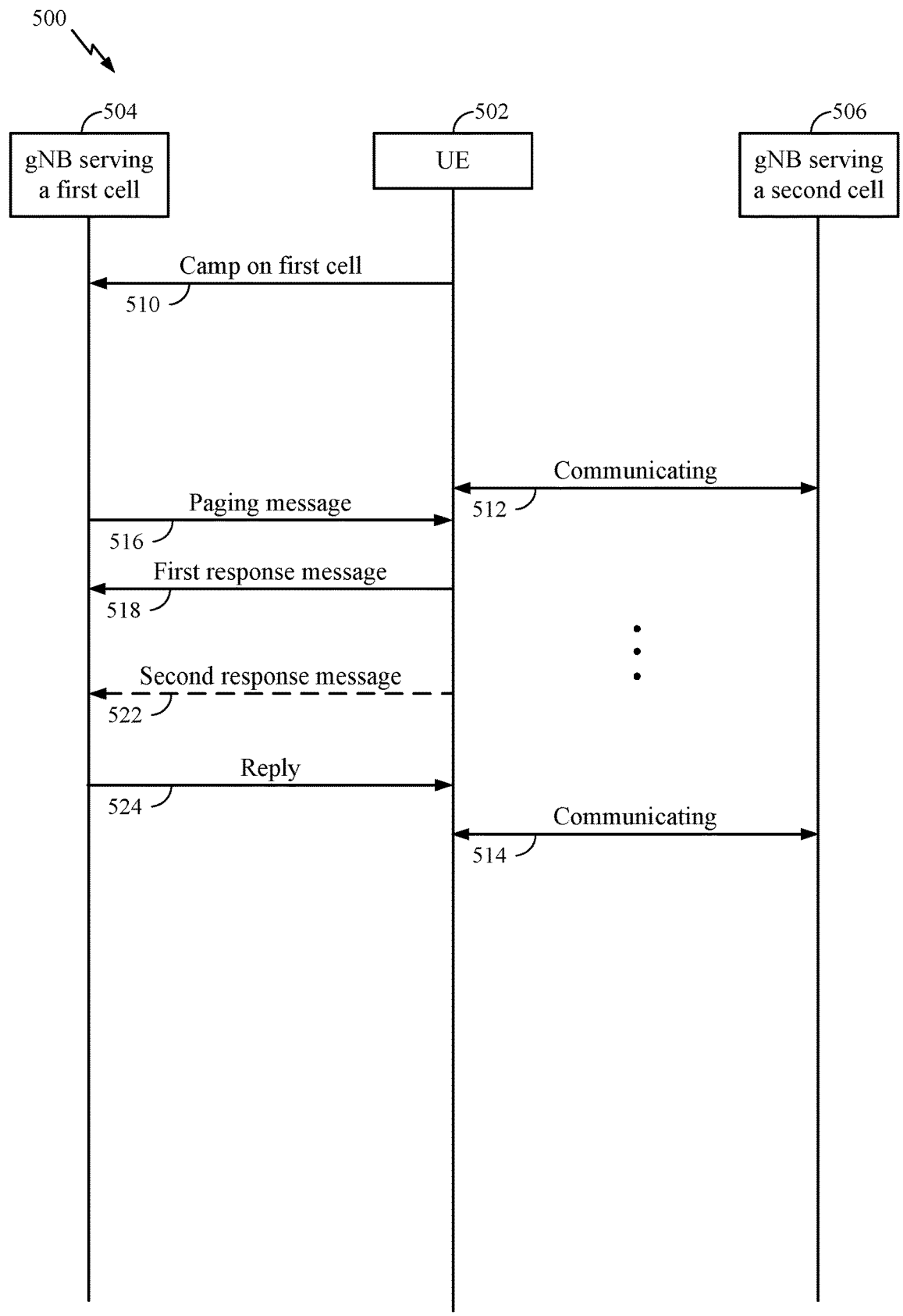
FIG. 5 is a call flow diagram illustrating example signaling for a multi-USIM UE to respond to paging, in accordance with aspects of the present disclosure.

FIG. 5 is an exemplary call flow 500 of a UE 502, a first gNB 504 serving a first cell, and a second gNB 506 serving a second cell. The UE is a multi-USIM UE or a C-RAT-capable UE, in accordance with aspects of the present disclosure. The call flow begins at 510 with the UE camping on the first cell, similar to block 305, as described above. At 512, the UE begins communicating with the second gNB. The communication between the UE and the second cell is ongoing and continues to at least 514. The first gNB sends a paging message to the UE at 516. The paging message may indicate a preamble and/or transmission resources for a first message of a RACH procedure that the UE may send to indicate the UE requests to enter an idle or inactive mode on the first cell. At 518, the UE transmits a first response message (e.g., a first message of the RACH procedure, an RRC message, or a MAC CE) to the first gNB. The first response message indicates that the UE requests to enter an idle or inactive mode on the first cell, according to the aspects described herein. Optionally, at 522, the UE transmits a second response message to the first gNB. The second response message also indicates that the UE requests to enter an idle or inactive mode on the first cell, according to the aspects described herein. At 524, the first cell sends a reply message to the UE.

Figure 6:
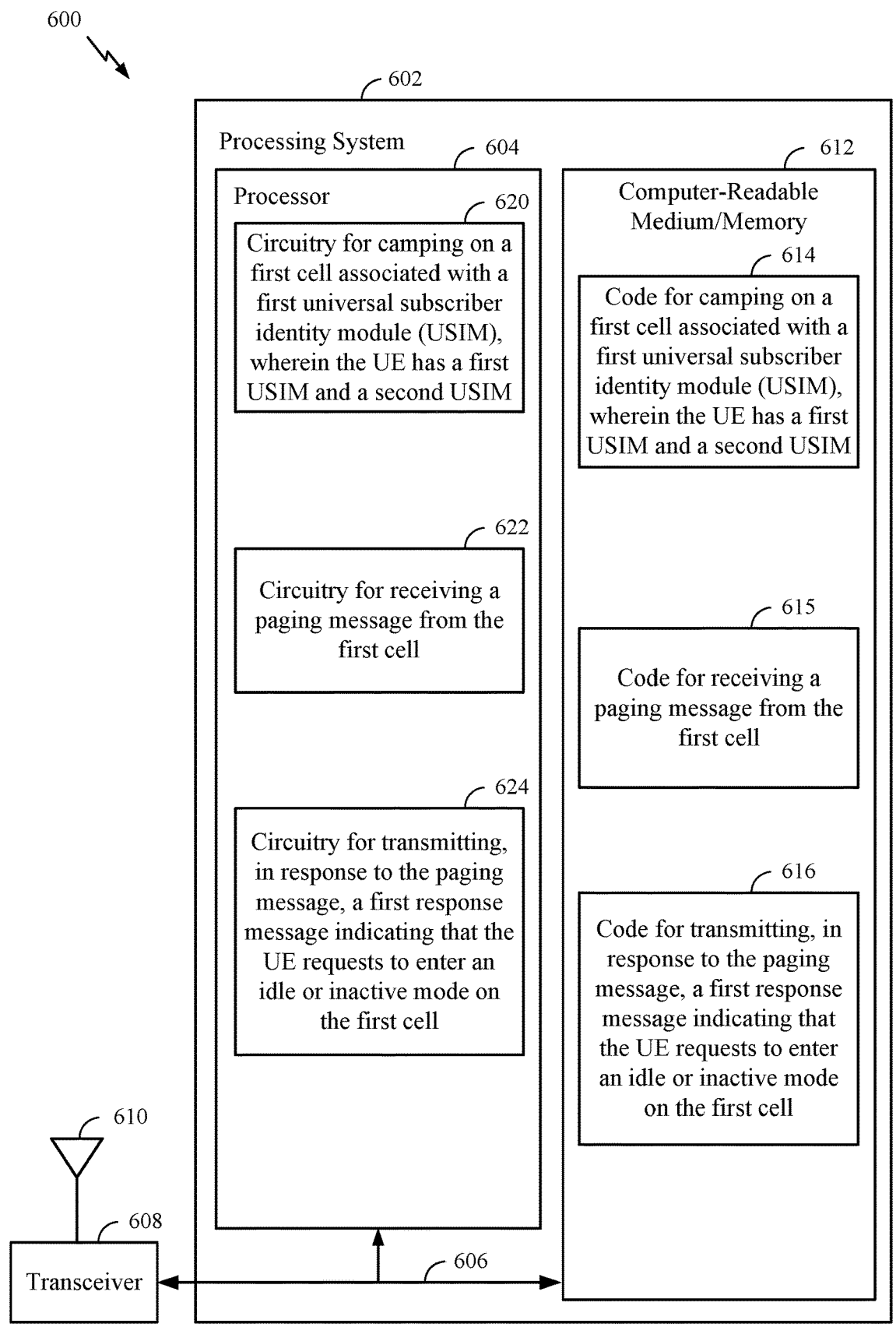
FIG. 6 illustrates a communications device that may include various components configured to perform the operations illustrated in FIG. 3, in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 3. The communications device 600 includes a processing system 602 coupled to a transceiver 608. The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 3, or other operations for performing the various techniques discussed herein for a multi-USIM UE or a C-RAT-capable UE to respond to a page from a cell by informing the network that the UE has received the page but requests to go back to an idle or inactive mode on the cell. In certain aspects, computer-readable medium/memory 612 stores code 614 for camping on a first cell associated with a first universal subscriber identity module (USIM), wherein the UE has a first USIM and a second USIM; code 615 for receiving a paging message from the first cell; and code 616 for transmitting, in response to the paging message, a first response message indicating that the UE requests to enter an idle or inactive mode on the first cell. In certain aspects, the processor 604 has circuitry configured to implement the code stored in the computer-readable medium/memory 612. The processor 604 includes circuitry 620 for camping on a first cell associated with a first universal subscriber identity module (USIM), wherein the UE has a first USIM and a second USIM; circuitry 622 for receiving a paging message from the first cell; and circuitry for transmitting, in response to the paging message, a first response message indicating that the UE requests to enter an idle or inactive mode on the first cell.

Figure 7:
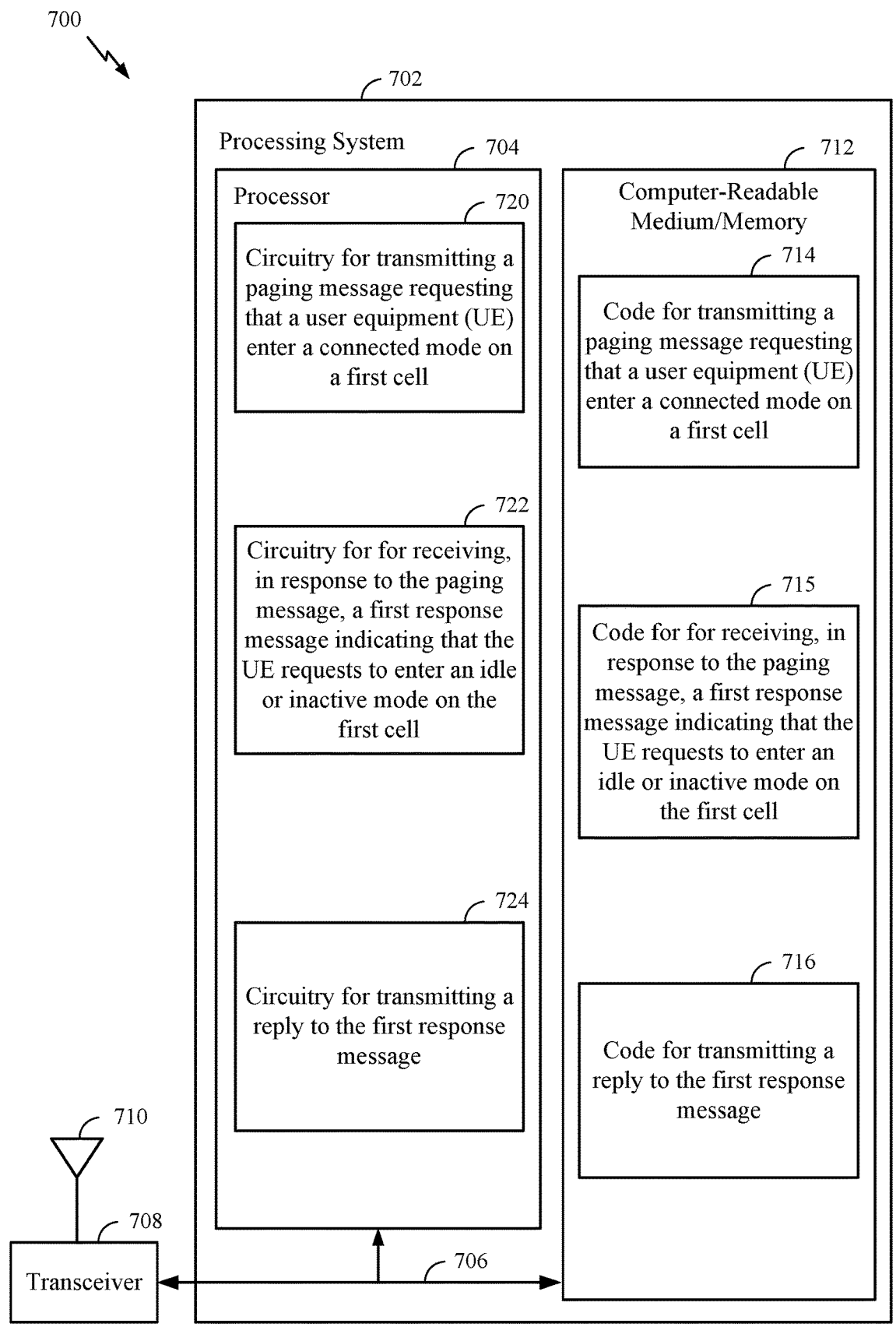
FIG. 7 illustrates a communications device that may include various components configured to perform the operations illustrated in FIG. 4, in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 4. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein for a multi-USIM UE or a C-RAT-capable UE to respond to a page from a cell by informing the network that the UE has received the page but requests to go back to an idle or inactive mode on the cell. In certain aspects, computer-readable medium/memory 712 stores code 714 for transmitting a paging message requesting that a user equipment (UE) enter a connected mode on a first cell; code 715 for receiving, in response to the paging message, a first response message indicating that the UE requests to enter an idle or inactive mode on the first cell; and code 716 for transmitting a reply to the first response message. In certain aspects, the processor 704 has circuitry configured to implement the code stored in the computer-readable medium/memory 712. The processor 704 includes circuitry 720 for transmitting a paging message requesting that a user equipment (UE) enter a connected mode on a first cell; circuitry 722 for receiving, in response to the paging message, a first response message indicating that the UE requests to enter an idle or inactive mode on the first cell; and circuitry 724 for transmitting a reply to the first response message.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 3 and/or FIG. 4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communications performed by a user equipment (UE), comprising:
    camping on a first cell associated with a first universal subscriber identity module (USIM), wherein the UE has a first USIM and a second USIM;
    receiving a paging message from the first cell; and
    transmitting, in response to the paging message, a first response message indicating that the UE requests to enter an idle or inactive mode on the first cell, wherein the first response message also indicates a period after which the UE will request to move to a connected mode on the first cell in response to the paging message.

2. The method of claim 1, wherein the UE is in an idle or connected mode on a second cell associated with the second USIM.

3. The method of claim 1, wherein the first response message comprises a radio resource control (RRC) message.

4. The method of claim 3, wherein:
    the first response message comprises at least one of a radio resource control (RRC) Setup Request message or an RRC Resume Request message; and
    the first response message comprises a cause value indicating that the UE requests to enter the idle or the inactive mode on the first cell.

5. The method of claim 1, wherein:
    the UE is in an inactive mode on the first cell prior to receiving the paging message; and
    the first response message indicates that the UE requests to enter the idle mode on the first cell.

6. The method of claim 1, wherein the first response message comprises a medium access control (MAC) control element (CE).

7. The method of claim 1, further comprising:
    transmitting one or more second response messages indicating that the UE requests to enter the idle mode or the inactive mode on the first cell.

8. The method of claim 7, further comprising:
    receiving a reply from the first cell; and
    ceasing transmitting the second response messages, based on the reply.

9. The method of claim 7, further comprising:
    requesting, from a second cell associated with the second USIM, additional time to receive a reply from the first cell before resuming communications via the second cell, prior to receiving the reply from the first cell.

10. The method of claim 1, wherein the first response message comprises a first message of a random access channel (RACH) procedure.

11. The method of claim 10, wherein the RACH procedure comprises a four-step RACH procedure, and the method further comprises:
    obtaining a preamble and transmission resources for the first message of the four-step RACH procedure from the paging message.

12. The method of claim 10, wherein the RACH procedure comprises a two-step RACH procedure, and the method further comprises:
    obtaining preamble resources and payload resource for the first message of the two-step RACH procedure from the paging message.

13. The method of claim 1, further comprising:
    refraining from entering a connected mode on the first cell.

14. A method of wireless communications performed by a base station (BS), comprising:
    transmitting a paging message requesting that a user equipment (UE) enter a connected mode on a first cell;
    receiving, in response to the paging message, a first response message indicating that the UE requests to enter an idle or inactive mode on the first cell, wherein the first response message also indicates a period after which the UE will request to enter the connected mode on the first cell in response to the paging message; and
    transmitting a reply to the first response message.

15. The method of claim 14, wherein the first response message comprises a first message of a random access channel (RACH) procedure and the method further comprises:
    transmitting an indication of a preamble and transmission resources for the first message of the RACH procedure in the paging message.

16. The method of claim 15, wherein the RACH procedure comprises a four-step RACH procedure.

17. The method of claim 15, wherein the RACH procedure comprises a two-step RACH procedure.

18. The method of claim 15, further comprising:
    determining to transmit the indication of the preamble and the transmission resources based on the UE having multiple universal subscriber identity modules (USIMs) or the UE supporting paging differentiation.

19. The method of claim 14, wherein:
    the first response message comprises a first message of a random access channel (RACH) procedure; and
    the reply comprises a random access response (RAR) message.

20. The method of claim 14, wherein the first response message comprises a first radio resource control (RRC) message and the method further comprises:

sending a second RRC message to the UE replying to the first response message.

21. The method of claim 20, wherein the second RRC message comprises an RRC Release message or an RRC Reject message.

22. The method of claim 14, wherein the first response message comprises a first medium access control (MAC) control element (CE) and the method further comprises:

sending a second MAC CE to the UE replying to the first response message.

23. The method of claim 14, wherein the first response message includes a request from the UE to move to the idle mode on the first cell, and the method further comprises:

releasing an inactive mode connection to the UE; and
moving the UE to the idle mode on the first cell.

24. The method of claim 14, further comprising:

informing an access management function (AMF) that the UE has responded to the paging message.

25. The method of claim 14, further comprising:

informing a mobility management entity (MME) that the UE has responded to the paging message.

26. The method of claim 14, further comprising:

informing an anchor next generation NodeB (gNB) that the UE has responded to the paging message.

27. The method of claim 14, further comprising:

informing an access management function (AMF) or an anchor next generation NodeB (gNB) of the period.

28. The method of claim 14, further comprising:

informing a mobility management entity (MME) of the period.

29. An apparatus for wireless communications at a user equipment (UE), comprising:

memory;
one or more processors coupled with the memory, the one or more processors configured to cause the UE to:
camp on a first cell associated with a first universal subscriber identity module (USIM), wherein the UE has a first USIM and a second USIM;
receive a paging message from the first cell; and
transmit, in response to the paging message, a first response message indicating that the UE requests to enter an idle or inactive mode on the first cell, wherein the first response message also indicates a period after which the UE will request to move to a connected mode on the first cell in response to the paging message.

\* \* \* \* \*